United States Patent
Coleman et al.

(10) Patent No.: US 12,203,739 B2
(45) Date of Patent: Jan. 21, 2025

(54) SYSTEM FOR DETERMINING OPTICAL PROBE LOCATION RELATIVE TO A PHOTONIC INTEGRATED CIRCUIT

(71) Applicant: Keysight Technologies, Inc., Santa Rosa, CA (US)

(72) Inventors: Christopher Coleman, Santa Clara, CA (US); Ryan Scott, Woodland, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 410 days.

(21) Appl. No.: 17/538,573

(22) Filed: Nov. 30, 2021

(65) Prior Publication Data
US 2022/0299312 A1 Sep. 22, 2022

Related U.S. Application Data

(60) Provisional application No. 63/162,142, filed on Mar. 17, 2021.

(51) Int. Cl.
*G01B 11/00* (2006.01)
*G02B 27/42* (2006.01)

(52) U.S. Cl.
CPC ........ *G01B 11/005* (2013.01); *G02B 27/4233* (2013.01)

(58) Field of Classification Search
CPC ..................... G01B 11/005; G02B 27/4233
See application file for complete search history.

(56) References Cited

U.S. PATENT DOCUMENTS

| | | | |
|---|---|---|---|
| 3,940,608 A | 2/1976 | Kissinger et al. | |
| 7,024,066 B1 * | 4/2006 | Malendevich | G02B 6/122 385/11 |
| 7,184,626 B1 | 2/2007 | Gunn, III et al. | |
| 8,447,150 B2 * | 5/2013 | Kopp | G02B 6/30 385/37 |
| 10,088,299 B2 | 10/2018 | Tokushima | |
| 2019/0258175 A1 | 8/2019 | Dietrich et al. | |

FOREIGN PATENT DOCUMENTS

| | | |
|---|---|---|
| WO | 2019/235163 A1 | 12/2019 |
| WO | 2019/235182 A1 | 12/2019 |

OTHER PUBLICATIONS

U.S. Appl. No. 60/461,041, filed Apr. 7, 2003, 14 pgs.
English translation of WO2019235163A1, 5 pgs.
(Continued)

*Primary Examiner* — Rebecca C Bryant

(57) ABSTRACT

A system for determining optical probe location relative to a photonic integrated circuit (PIC) is described. A diffractive optical element (DOE) disposed in the PIC, and has a focal point of absolute maximum reflection at location having coordinates in three-dimensions above the PIC. The system includes an optical waveguide probe, and an optical source adapted to provide light through the optical waveguide probe and incident on the DOE. The DOE reflects and focuses light back to the optical waveguide probe, and a power meter is adapted to receive at least a portion of the light reflected and focused at the focal point above the PIC. Based on the determination of a location of the absolute maximum reflection, consistent and reliable testing of PIC can be achieved.

20 Claims, 5 Drawing Sheets

(56) References Cited

OTHER PUBLICATIONS

English translation of WO2019235182A1, 4 pgs.
P.-I. Dietrich et al., "Lenses for Low-Loss Chip-to-Fiber and Fiber-to-Fiber Coupling Fabricated by 3D Direct-Write Lithography", Optical Society of America, 2016, 2 pgs.
Qingbin Fan et al., "Visible light focusing flat lenses based on hybrid dielectric-metal metasurface reflector-arrays", Scientific Reports, Mar. 23, 2017, www.nature.com/scientificreports, pp. 1-9.
David Fattal et al., "Flat dielectric grating reflectors with focusing abilities", Nature Photonics, May 2, 2010, www.nature.com/naturephotonics, pp. 1-6.

* cited by examiner

With Si Slab 210

No Si Slab 212

SYSTEM FOR DETERMINING OPTICAL PROBE LOCATION RELATIVE TO A PHOTONIC INTEGRATED CIRCUIT

CROSS-REFERENCE TO RELATED APPLICATION

The present application claims priority under 35 U.S.C. § 119(e) and under 37 C.F.R. § 1.78(a) to commonly owned U.S. Provisional Application No. 63/162,142 filed on Mar. 17, 2021. The entire disclosure of U.S. Provisional Application No. 63/162,142 is specifically incorporated herein by reference in its entirety.

BACKGROUND

Photonic Integrated Circuits (PICs) are ubiquitous in many aspects of communications, including optical fiber communications, as well as in other technical fields. The PICs may include various optical elements to include active optoelectronic devices, optical interferometers, splitting optical elements and filtering optical elements, to name a few. These various optical elements are selectively connected to one another, and to optical components connected to the PIC by optical waveguides of one of a variety of optical waveguides disposed in the PIC.

As will be appreciated, during the fabrication of the PIC and devices that include the PIC, testing of the function of the various optical elements of the PIC is useful This testing is beneficially non-contact testing to avoid damaging either the PIC or the optical probe during the testing. As such, the positioning of the probe must be controlled. Current optical probe position controls concentrate primarily on sensing probe height using capacitive proximity sensors and optical displacement sensors, such as interferometers and confocal chromatic sensors.

Unfortunately, known optical probe position control methods have certain disadvantages that can be problematic in applications. For example, the sensors that are currently used in optical probe position controls can be large compared to the size of the optical probe and must be remoted from the probing location. Moreover, known techniques provide only a single height measurement for an array of probes which may need multiple control points. Furthermore, known techniques use 'displacement' sensors, which do not measure distances, and thereby these known techniques are limited to tracking relative offsets What is needed, therefore, is a system and method for controlling the height of an optical probe that overcomes at the drawbacks of the known systems and methods described above.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
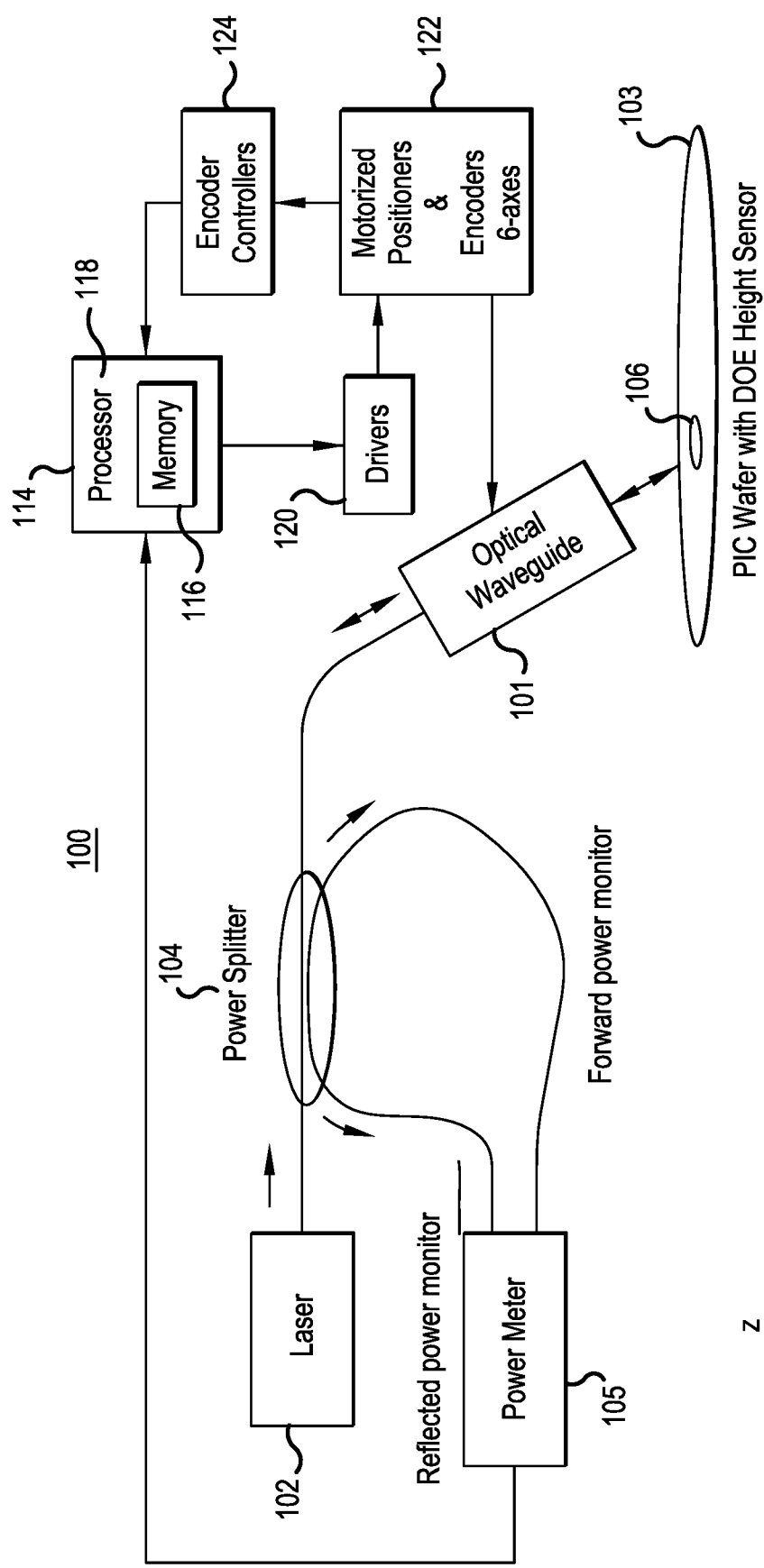
FIG. 1 shows a simplified schematic block diagram of a system for determining optical probe location relative to a PIC in accordance with a representative embodiment.

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure.

The terminology used herein is for purposes of describing particular embodiments only and is not intended to be limiting. As used in the specification and appended claims, the singular forms of terms 'a', 'an' and 'the' are intended to include both singular and plural forms, unless the context clearly dictates otherwise. Additionally, the terms "comprises", and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to", or "coupled to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

As described herein in connection with various representative embodiments, a system for determining optical probe location relative to a photonic integrated circuit (PIC), comprises: a diffractive optical element (DOE) disposed in the PIC, the DOE having a focal point of absolute maximum reflection at location having coordinates in three-dimensions above the PIC; an optical waveguide probe; and an optical source adapted to provide light through the optical waveguide probe and incident on the DOE. The DOE reflects and focuses light back to the optical waveguide probe. The system also comprises a power meter adapted to receive at least a portion of the light reflected and focused at the focal point of maximum above the PIC; a motorized positioner adapted to move in optical waveguide probe in the three-dimensions above the PIC; and a controller comprising a processor and a memory that stores instructions, which when executed by the processor, causes the processor to: control the motorized positioner to: move the optical waveguide probe in a first plane to locate a first maximum reflection in the first plane; move the optical waveguide probe to a second plane, and move the optical waveguide probe in the second plane to locate a second maximum reflection in the second plane; move the optical waveguide probe to other planes until the absolute maximum reflection is located.

As described herein in connection with other various representative embodiments. a non-transitory computer readable medium that stores instructions for a system comprising: a photonic integrated circuit (PIC), comprising: a diffractive optical element (DOE) disposed in the PIC, the DOE having a focal point of absolute maximum reflection at location having coordinates in three-dimensions above the PIC; an optical waveguide probe; and an optical source adapted to provide light through the optical waveguide probe and incident on the DOE. The DOE reflects and focuses light back to the optical waveguide probe. The instructions, which when executed by a processor, cause the processor to: control a motorized positioner to: move an optical waveguide probe in a first plane to locate a first maximum reflection of a DOE diffractive focusing lens in the first plane; move the optical waveguide probe to a second plane, and move the optical waveguide probe in the second plane to locate a second maximum reflection of the DOE diffractive focusing lens in the second plane; and estimate a beam angle based on the first reflection maximum.

As described herein in connection with other various representative embodiments, a non-transitory computer readable medium adapted to store instructions, which when executed by a processor, cause the processor to: control a motorized positioner to: move an optical waveguide probe in a first plane to locate a first maximum reflection in the first plane; move the optical waveguide probe to a second plane, and move the optical waveguide probe in the second plane to locate a second maximum reflection in the second plane; estimate a beam angle based on the first and second reflection maxima; and move the optical waveguide probe along a line between the first maximum reflection and the second maximum reflection to locate the absolute maximum reflection in a third plane. The location of the absolute maximum reflection is a reference point in three dimensions.

As described herein in connection with other various representative embodiments, a method of determining location of an optical waveguide probe relative to a photonic integrated circuit (PIC) comprising a diffractive optical element (DOE) disposed in the PIC, the DOE having a focal point of maximum reflection at location having coordinates in three-dimensions above the PIC is disclosed. The method comprises: moving the optical waveguide probe in a first plane to locate a first maximum reflection in the first plane; moving the optical waveguide probe to a second plane, and moving the optical waveguide probe in the second plane to locate a second maximum reflection in the second plane; estimating a beam angle based on the first and second reflection maxima; and moving the optical waveguide probe along a line between the first maximum reflection and the second maximum reflection to locate the absolute maximum reflection in a third plane. The location of the absolute maximum reflection is a reference point in three dimensions.

FIG. 1 shows a simplified schematic block diagram of a system 100 for determining a location of an optical waveguide probe 101 relative to a PIC 103 in accordance with a representative embodiment.

The system 100 comprises a laser that is coupled to an optical waveguide (e.g., an optical fiber) as shown. Output from the laser 102 is provided to a power splitter 104, which may be one of a number of known types of passive optical waveguide splitters. As indicated by the arrows in FIG. 1, a portion of the emitted power of the laser 102 is provided to the optical waveguide probe 101, while another portion of the emitted power of the laser 102 is provided to a power meter 105. Illustratively, the power splitter 104 has a split ratio of 50:50, 70:30, or 90:10. The transmitted light that is measured by the power meter 105 is useful for taking a referenced measurement, which is discussed below. The ratio of reflected to transmitted light gives a more accurate result because it corrects for variations in the laser output power. As described more fully below, readings from the power meter 105 are used to determine a location of an absolute maximum reflected power from the PIC 103.

The portion of the light transmitted to the optical waveguide probe 101 from the power splitter 104 is incident on a diffractive optical element (DOE) 106 disposed at a surface of the PIC 103. The DOE 106 reflects light that is incident thereon back to the optical waveguide probe 101, and is provided to the power meter 105 through the power splitter 104.

The power readings of the reflected power are provided to a controller 114, and as described more fully below, are used by the controller to adjust a height (z-direction in the coordinate system of FIG. 1) of the optical waveguide probe 101 to be located at the point of the absolute maximum reflected power from the DOE 106 of the PIC 103. As will be appreciated by one of ordinary skill in the art, the location of the maximum reflected power from the DOE 106 of the PIC 103 is the focal point of the DOE, and is fixed in three-dimensions.

The controller 114 is coupled to a memory 116 and includes processor 118. The controller 114 is adapted to support a processor 118, which is tangible and non-transitory, is representative of one or more processors. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. The processor 118 (and other processors) of the present teachings is an article of manufacture and/or a machine component. The processor 118 for the controller 114 is configured to execute software instructions stored in the memory 116 to perform functions as described in the various embodiments herein.

The processor 118 may be a general-purpose processor or may be part of an application specific integrated circuit (ASIC). The processor 118 may also be (or include) a microprocessor, a microcomputer, a processor chip, a controller, a microcontroller, a digital signal processor (DSP), a state machine, or a programmable logic device. The processor 118 may also be (or include) a logical circuit, including a programmable gate array (PGA) such as a FPGA, or another type of circuit that includes discrete gate and/or transistor logic. The processor 118 may be (or include) a central processing unit (CPU), a graphics processing unit (GPU), or both. Additionally, the processor 118 may comprise multiple processors, parallel processors, or both. Multiple processors may be included in, or coupled to, a single device or multiple devices.

The memory 116 may comprise a main memory, a static memory, or both, where the memories may communicate with each other via a bus (not shown). The memory 116 described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. The memory 116 of the present teachings is an article of manufacture and/or machine component. The memory 116 includes one or more computer-readable mediums from which data and executable instructions (e.g., to carry out the processes described in connections with FIGS. 3A-4) can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known to one of ordinary skill in the art. Memories of the present teachings may be volatile or non-volatile, secure and/or encrypted, unsecure and/or unencrypted. The controller 114, the memory 116 and the processor 118 may be housed within or linked to a workstation (not shown) such as a computer or another assembly of one or more computing devices, a display/monitor, and one or more input devices (e.g., a keyboard, joysticks and mouse) in the form of a standalone computing system, a desktop or a tablet, for example.

As described more fully below, the controller 114 issues control commands to drivers 120, which may also be referred to as motor controllers. The drivers 120 provide signals to motorized positioners 122, which illustratively include encoders to effect multi-axis (e.g., 6 axis) movement of the optical waveguide probe 101 in the locating of the maximum reflected power from the DOE 106. Illustratively, the drivers 120 are firmware and electronic circuits that translate motion instructions from the controller 114 into the physical signals needed to actuate the particular motor type of motorized positioners 122 in use.

The motorized positioners 122 are illustrative translation stage assemblies in hardware, and may include known motor technologies such as stepper motors, linear motors, piezoelectric motors, to name only a few. The encoders of the motorized positioners 122 are illustratively hardware mounted to the translations stages to monitor actual motion of the translation stages. The encoders can be one or more of known optical, magnetic or capacitive encoders.

Finally, the system 100 comprises encoder controllers 124 that comprise firmware and electronic circuits that translate the physical signals generated by the motion encoders into stage position. Notably, the encoder controllers 124 translate the physical signals output by the encoders into stage positions, and reports the stage positions back to the controller 114.

As described more fully below, in accordance with a representative embodiment, the system 100 enables the determination of the location of the absolute maximum reflected power from the DOE 106, and thereby in a non-contact manner enables the positioning of test probes used in the testing of PICs. In one representative embodiment, the controller 114 is adapted to command the motorized positioner 122 to: move the optical waveguide probe 101 in a first plane (see FIG. 3A-3B) to locate a first maximum reflection in the first plane; move the optical waveguide probe 101 to a second plane (see FIGS. 3A-3B), and move the optical waveguide probe 101 in the second plane to locate a second maximum reflection in the second plane; and move the optical waveguide probe 101 to other planes until an absolute maximum reflection is located. These and other aspects of the present teachings are described more fully below in connection with FIGS. 3A-4.

Figure 2A:
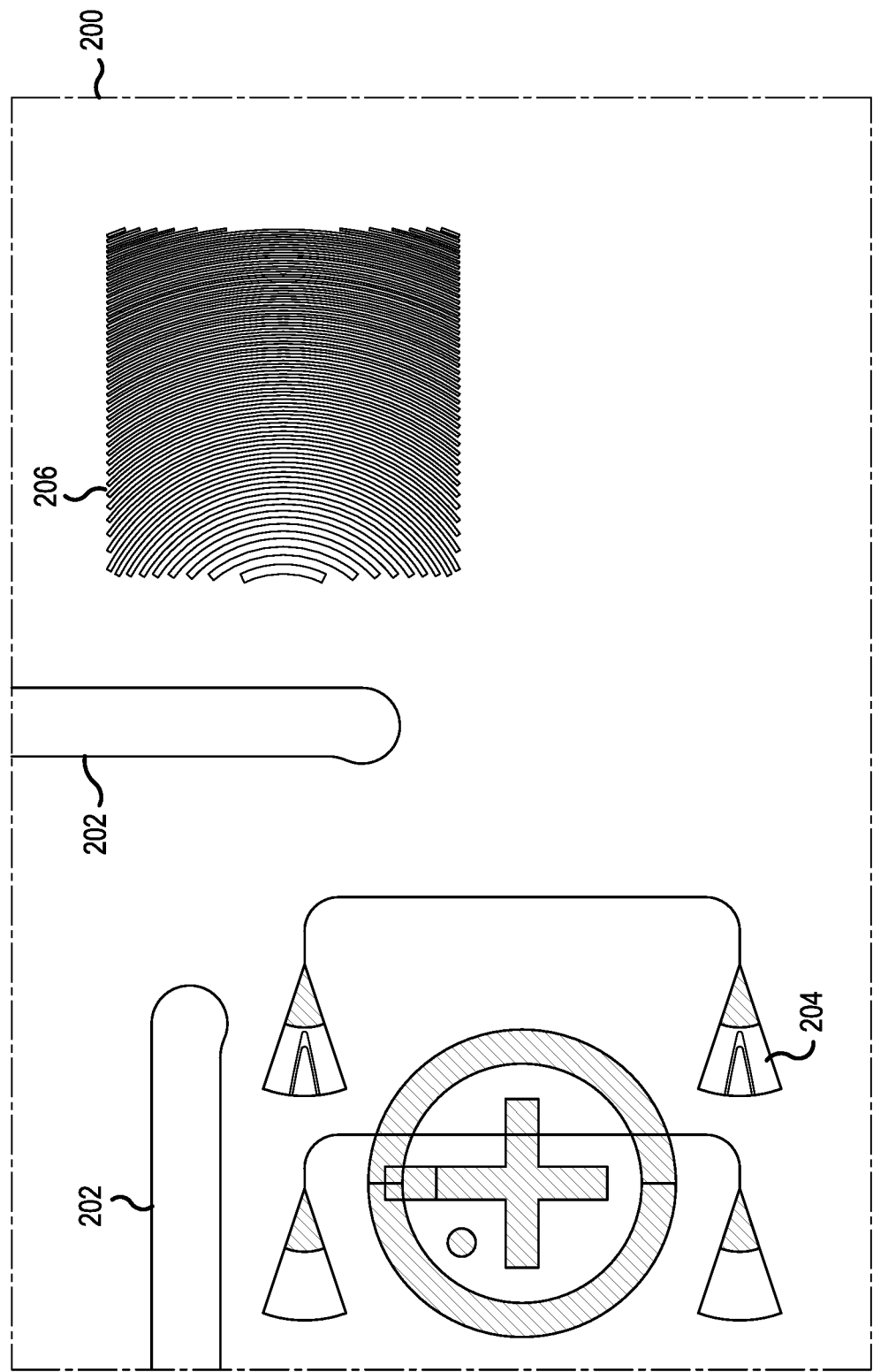
FIG. 2A shows a portion of a PIC comprising a diffractive optical element (DOE) in accordance with a representative embodiment.

FIG. 2A shows a portion of a PIC 200 comprising a diffractive optical element (DOE) 206 in accordance with a representative embodiment. Notably, many aspects and details of the representative described in connection with FIG. 2A may be common to those described above in connection with FIG. 1. These common aspects and details may not be repeated to avoid obscuring the description of the PIC 200 presently described.

The portion of PIC 200 may be a portion of the PIC 103 described previously. The PIC 200 comprises various optical waveguides 202 and passive and active optical elements 204 that are connected by the optical waveguides to effect one of a variety of functions such as optical communications.

The DOE 206 is provided at a location of the portion of the PIC 200 and is used to adjust the height of an optical waveguide probe (e.g., optical waveguide probe 101) to be located at a location of an absolute maximum reflection so that contactless testing of the PIC can be carried out.

Figure 2B:
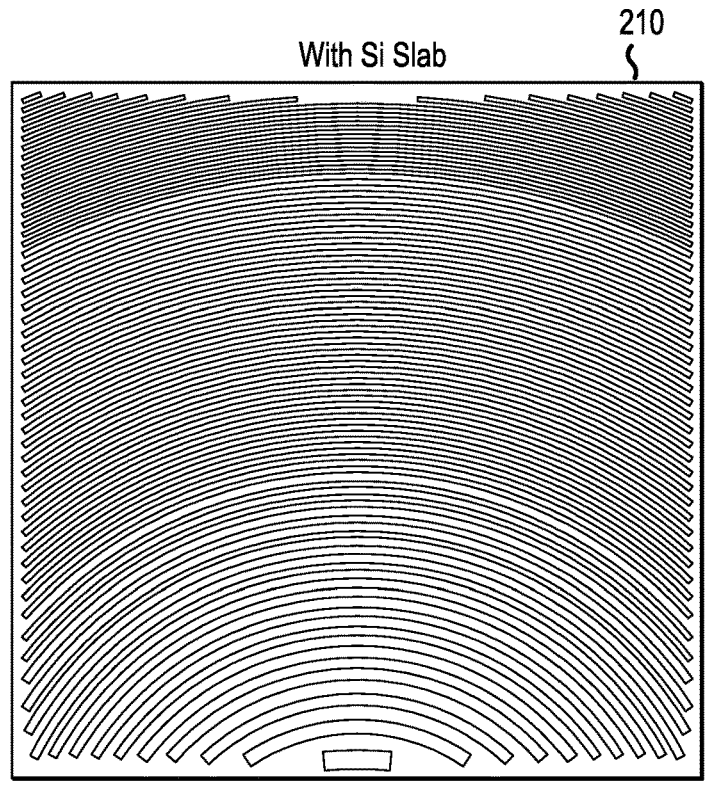
FIGS. 2B-2C show perspective views of diffractive optical elements (DOE's) with the silicon slab and with the silicon slab removed, respectively, and in accordance with representative embodiments.
Figure 2C:
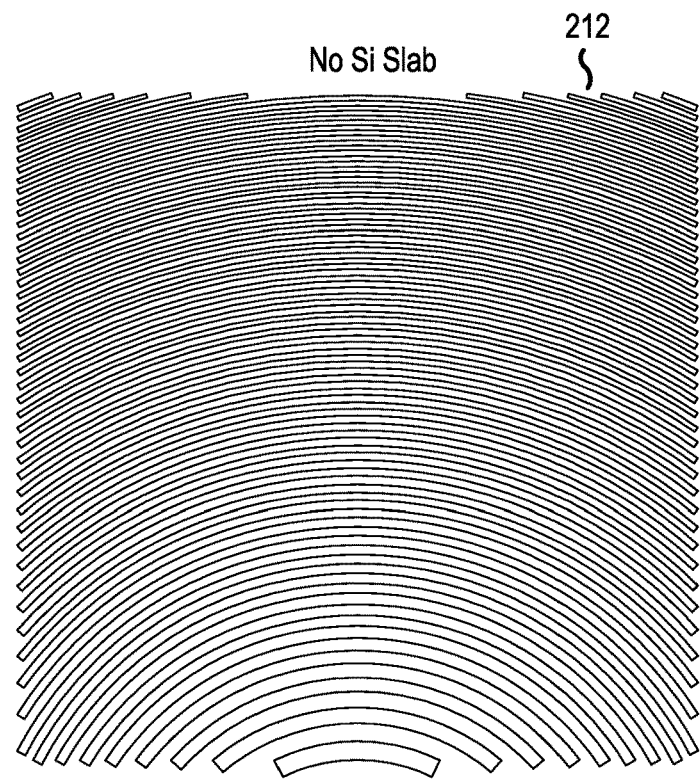

FIGS. 2B-2C show top views of diffractive optical elements (DOE's) contemplated for use as the DOE 206 disposed in the PIC in accordance with a representative embodiment. Notably, many aspects and details of the representative described in connection with FIGS. 1-2A may be common to those described above in connection with FIGS. 2A-2B. These common aspects and details may not be repeated to avoid obscuring the description of the DOEs presently described.

In accordance with a representative embodiment, DOEs 210, 212 are disposed over a silicon substrate (not shown) and comprise a layer of silicon (not shown) disposed between a lower layer of $SiO_2$ and an upper layer of $SiO_2$, which are not shown. Alternatively, the DOEs 210, 212 could comprise silicon nitride, indium phosphide, or lithium niobate, for example. The grooves shown are formed using a known etching process, and have a spacing designed to effect selective reflection of light (e.g., from the optical waveguide probe). Notably, DOEs 210, 212 are not linear diffraction gratings. To this end, and as is known to one of ordinary skill in the art, the curved arc of DOEs 210, 212 are designed to define the location in three dimensions where the absolute maximum reflection will occur.

Notably, the DOEs 210, 212 may be fabricated during front-side processing of the PIC in which they are disposed, and thereby are an integral part of the PIC, and are integrally formed during fabrication of the PIC. By way of illustration, the DOEs 210, 212 are free-space diffractive optical elements that can be designed into the semiconductor waveguiding layer of standard PIC fabrication processes. Specifically, using a known 'slab waveguide' fabrication process, binary surface relief, reflective diffractive elements can be realized, and in accordance with representative embodiments form a focusing lens for locating an optimal location (height) of the optical waveguide probe used in testing of the PIC. Fabrication of diffractive structures such as DOEs 210, 212 made in a wafer fabrication process of the PIC provide a very repeatable and accurate absolute reference. Only the pitch of the diffractive grooves determines the absolute position of the reference signals from the optical waveguide probe. The pitch control of optical lithography is very accurate and repeatable. Process errors in etch depth or groove width will only effect efficiency of the reflected power, but not their reference position (i.e., focal point). The relative maximization of power signals makes the use of the references independent of absolute efficiency.

Alternatively, the DOEs 210, 212 may be formed separately from the fabrication of the PIC, and attached to the surface of the PIC using a known adhesive bonding method.

Generally, the DOEs may include the silicon slab that is part of the waveguiding layer in which they are formed, or may have the silicon slab removed. Notably, DOE 210 includes the silicon slab and DOE 212 has the silicon slab removed.

The DOEs 210, 212, which are focusing lenses, can be designed to retro-reflect and focus light from the optical waveguide probe (e.g., optical waveguide probe 101) back into itself at a specific (x,y,z) position (the focal point) in space. As alluded to above, and as described more fully below, when the optical waveguide probe is placed at this (x,y,z) position, the reflected power that returns back into the optical waveguide probe is at an absolute maximum. By the present teachings, a three-dimensional optimization search of reflected power is used to find the peak position. Once found, the fiber probe's absolute (x,y,z) position is known relative to the PIC. This absolute reference position is then transferred to some other relative tracking sensor, such as position encoders on motorized translation stages (e.g., encoders of the motorized positioner 122 describe above). Offsets in height of the optical waveguide probe can be tracked to maintain knowledge of its absolute position. Notably, and as described more fully below, while the DOEs 210 (or diffractive focusing lens) are very sensitive to position, but insensitive to beam angle. This is a useful feature as the position reference will work for a wide range of different optical probe beam angles.

Figure 3A:
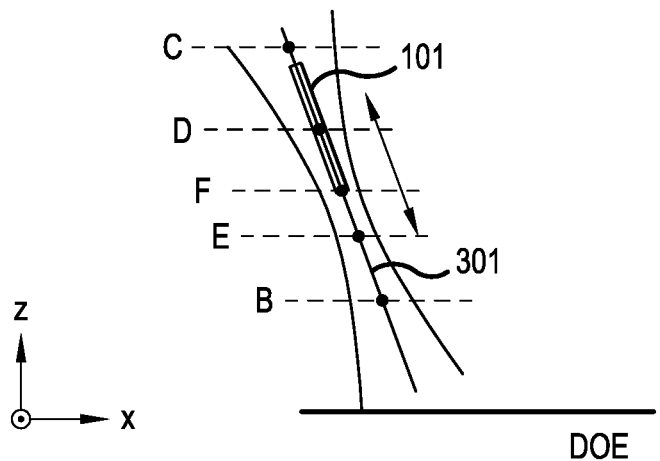
FIG. 3A shows a sequence of a method useful in determining an absolute maximum reflection point at a particular angle in accordance with a representative embodiment.

FIG. 3A shows a method useful in determining an absolute maximum reflection point at a particular angle in accordance with a representative embodiment. Notably, many aspects and details of the representative described in connection with FIGS. 1-2C may be common to those described above in connection with FIG. 3A. These common aspects and details may not be repeated to avoid obscuring the description of the sequence used to determine the location of an absolute maximum reflection point presently described. Furthermore, the sequence described presently is similar to the method described in connection with FIG. 4. As alluded to above, the sequence of FIG. 3A is contemplated for use in connection with the system 100 of FIG. 1, and as described more fully below, is implemented as instructions stored in memory 116 executed by the processor 118 of the controller 114.

Referring to FIG. 3A, the optical waveguide probe 101 is moved using the motorized positioner 122 based on control signals from the controller 114 to adjust its height (z-direction in the coordinate system of FIG. 3A) to a plane "B." As noted above, the control signals from the controller 114 are determined are based on instructions stored in the memory 116, and are executed by a processor 118 to cause the processor 118 to move the motorized positioner 122 as described above in connection with FIG. 1, and more fully below in connection with FIG. 4. Again, and based on instructions stored in memory 116, control signals from the controller 114 cause the optical waveguide probe 101 to be moved using the motorized positioner 122 within the plane B (i.e., in an x, y plane according to the coordinate system of FIG. 3A) to locate local maximum reflection in plane B (solid dot in plane B) based on the power returned to the power meter 105 of the system 100 by way of the optical waveguide probe 101 and the power splitter 104. This is recorded in memory 116 as the first maximum reflection.

Figure 4:
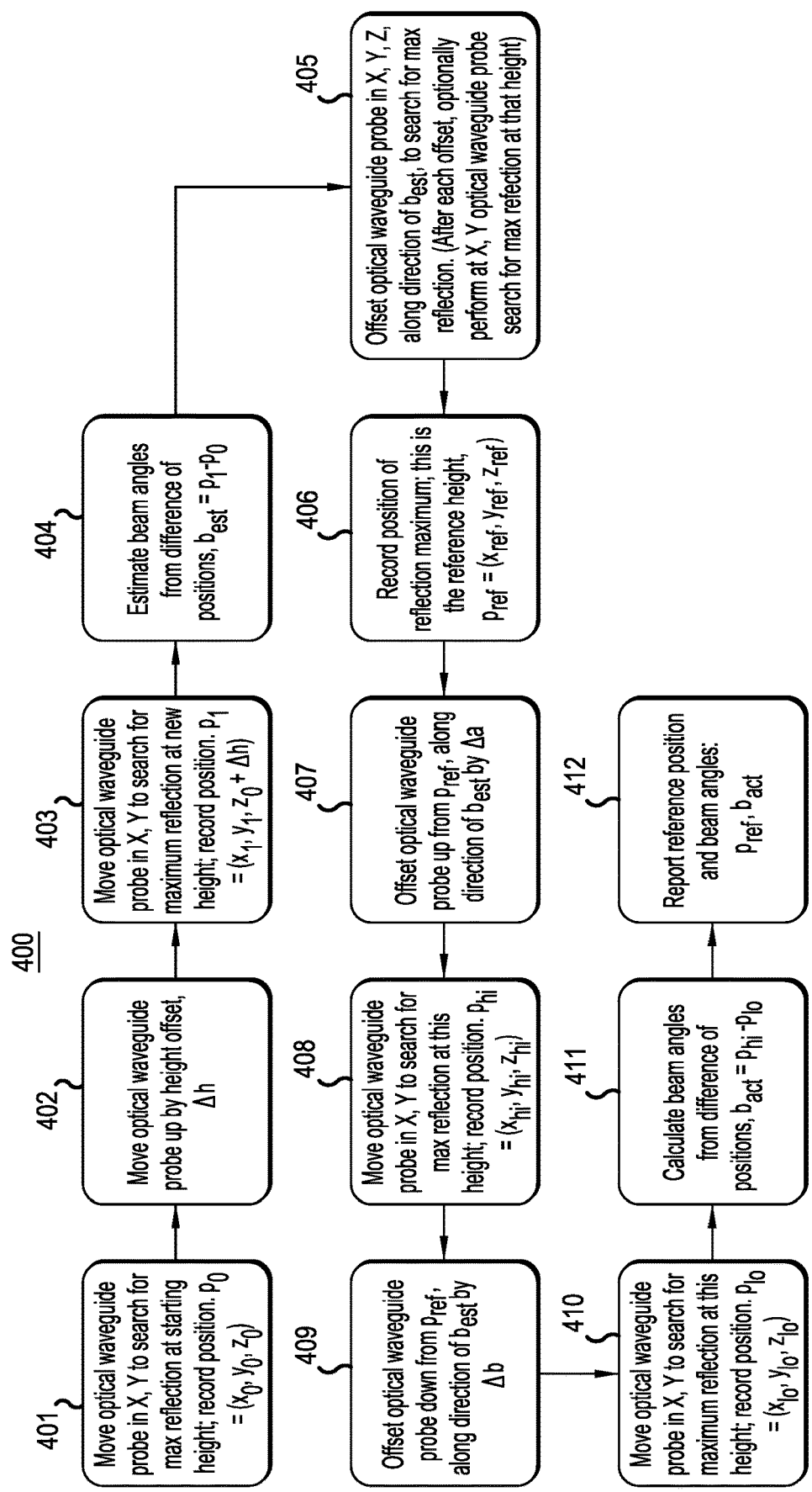
FIG. 4 shows a flow-chart of a method of determining optical probe location relative to PIC in accordance with a representative embodiment.

After recording the power level of the first maximum, the optical waveguide probe 101 is moved using the motorized positioner 122 based on control signals from the controller 114 to adjust its height (z-direction in the coordinate system of FIG. 3A) to a plane "C." Again, the control signals from the controller 114 are determined are based on instructions stored in the memory 116, and are executed by a processor 118 to cause the processor 118 to move the motorized positioner 122 as described above in connection with FIG. 1, and more fully below in connection with FIG. 4. Based on instructions stored in memory 116, control signals from the controller 114 cause the optical waveguide probe 101 to be moved using the motorized positioner 122 within the plane C (i.e., in an x, y plane according to the coordinate system of FIG. 3A) to locate local maximum reflection in plane C based on the power returned to the power meter 105 of the system 100 by way of the optical waveguide probe 101 and the power splitter 104. This is recorded in memory 116 as the second maximum reflection.

This sequence is continued and the optical waveguide probe 101 along a line 301 between the first maximum reflection in plane B and the second maximum reflection in plane C to other planes (e.g., planes F, D, E) until an absolute maximum reflection is located. This location may be referred to herein as the reference position in three-dimensions. Notably, the line 301 is the center-line of the illumination and, as discussed more fully below, determines the beam pointing angles. Once the location of the maximum reflection is located, the height of the optical waveguide probe for further testing of the PIC is set, and fosters reliably reproducible testing of the PIC. Notably, one method used to determine the location of the absolute maximum reflection is described more fully in connection with a representative embodiment of FIG. 4 below.

Notably, and as described in connection with representative embodiments of FIG. 4, after the location of the absolute maximum reflection (the reference position) is determined, the sequence may be continued in other planes to refine the beam angle. For example, if after determining the location of the absolute maximum reflection is at the solid dot in plane F (the reference position), the sequence may be continued with the optical waveguide probe 101 being moved using the motorized positioner 122 based on control signals from the controller 114 to adjust its height (z-direction in the coordinate system of FIG. 3A) to a plane "D." Again, the control signals from the controller 114 are determined are based on instructions stored in the memory 116, and are executed by a processor 118 to cause the processor 118 to move the motorized positioner 122 as described above in connection with FIG. 1, and more fully below in connection with FIG. 4. Based on instructions stored in memory 116, control signals from the controller 114 cause the optical waveguide probe 101 to be moved using the motorized positioner 122 within the plane D (i.e., in an x, y plane according to the coordinate system of FIG. 3A) to locate local maximum reflection in plane D based on the power returned to the power meter 105 of the system 100 by way of the optical waveguide probe 101 and the power splitter 104. This is recorded in memory 116 as a location of a fourth maximum reflection. However, and notably, by moving the optical waveguide probe 101 in the plane D, it may be determined that the location of the fourth maximum reflection is off the line 301. This will allow adjustment of the determined beam angle and will increase the accuracy of the positioning of the optical waveguide probe at a proper height and beam angle.

Further accuracy in locating the beam angle may be attained by continuing the sequence with the optical waveguide probe 101 being moved using the motorized positioner 122 based on control signals from the controller 114 to adjust its height (z-direction in the coordinate system of FIG. 3A) to a plane "E." Again, the control signals from the controller 114 are determined are based on instructions stored in the memory 116, and are executed by a processor 118 to cause the processor 118 to move the motorized positioner 122 as described above in connection with FIG. 1, and more fully below in connection with FIG. 4. Based on instructions stored in memory 116, control signals from the controller 114 cause the optical waveguide probe 101 to be moved using the motorized positioner 122 within the plane E (i.e., in an x, y plane according to the coordinate system of FIG. 3A) to locate local maximum reflection in plane E based on the power returned to the power meter 105 of the system 100 by way of the optical waveguide probe 101 and the power splitter 104. This is recorded in memory 116 as a location of a fifth maximum reflection. However, and notably, by moving the optical waveguide probe 101 in the plane E, it may be determined that the location of the fifth maximum reflection is off the line 301. This will allow further adjustment of the determined beam angle and will increase the accuracy of the positioning of the optical waveguide probe at a proper height and beam angle.

Figure 3B:
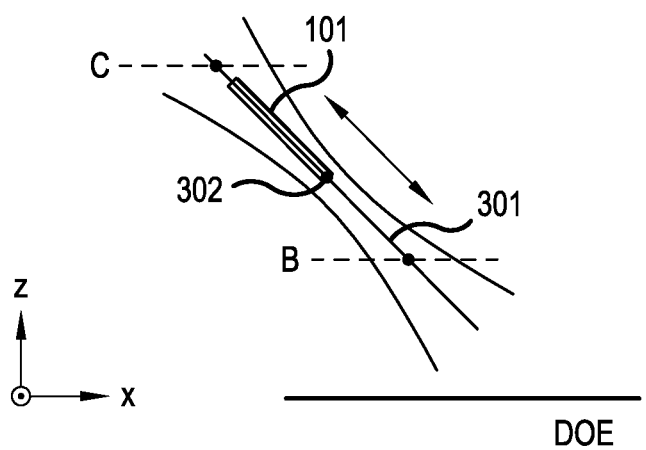
FIG. 3B shows a sequence of a method useful in determining the absolute maximum reflection point of FIG. 3A at another particular angle in accordance with a representative embodiment.

FIG. 3B shows a method useful in determining the absolute maximum reflection point of FIG. 3A at another particular angle in accordance with a representative embodiment. Notably, many aspects and details of the representative described in connection with FIG. 3B may be common to those described above in connection with FIGS. 1A-3A. These common aspects and details may not be repeated to avoid obscuring the description sequence for determining the location of the absolute maximum reflection presently described. As alluded to above, the sequence of FIG. 3B is contemplated for use in connection with the system 100 of FIG. 1, and as described more fully below, is implemented as instructions stored in memory 116 executed by the processor 118 of the controller 114.

For purposes of illustration, suppose point 302 along line 301 has been identified as the location of the absolute maximum reflection from the DOE. By moving the optical waveguide probe 101 using the motorized positioner 122 based on control signals from the controller 114 to adjust its height (z-direction in the coordinate system of FIG. 3B) to a plane "C." Again, the control signals from the controller 114 are determined are based on instructions stored in the memory 116, and are executed by a processor 118 to cause the processor 118 to move the motorized positioner 122 as described above in connection with FIG. 1, and more fully below in connection with FIG. 4. Based on instructions stored in memory 116, control signals from the controller 114 cause the optical waveguide probe 101 to be moved using the motorized positioner 122 within the plane C (i.e., in an x, y plane according to the coordinate system of FIG. 3A) to locate local maximum reflection (represented by the solid dot) in plane C based on the power returned to the power meter 105 of the system 100 by way of the optical waveguide probe 101 and the power splitter 104.

Similarly, moving the optical waveguide probe 101 using the motorized positioner 122 based on control signals from the controller 114 to adjust its height (z-direction in the coordinate system of FIG. 3B) to a plane "B." Again, the control signals from the controller 114 are determined are based on instructions stored in the memory 116, and are executed by a processor 118 to cause the processor 118 to move the motorized positioner 122 as described above in connection with FIG. 1, and more fully below in connection with FIG. 4. Based on instructions stored in memory 116, control signals from the controller 114 cause the optical waveguide probe 101 to be moved using the motorized positioner 122 within the plane B (i.e., in an x, y plane according to the coordinate system of FIG. 3B) to locate local maximum reflection (represented by the solid dot) in plane B based on the power returned to the power meter 105 of the system 100 by way of the optical waveguide probe 101 and the power splitter 104.

As will be appreciated, the location of the maximum reflected power from DOE reference (solid dot in plane F) determines the optimal location (in x, y, z) for the optical waveguide probe 101 for testing the PIC, but is insensitive to beam angle. So, assuming maximum reflected power from DOE reference (solid dot in plane F) is the same in FIGS. 3A and 3B, the beam angles are different. As such, the location of the maximum reflected power from the DOE is insensitive to the angle as a comparison of the angles of line 301 of FIG. 3A is with line 301 in FIG. 3B. As such, the location of the absolute maximum reflection (solid dot in plane "F") is insensitive to an angle of the optical waveguide probe 101. However the different beam angles of the probe can still be determined by calculating the vector that connects the maxima located in different planes, for example 'D' & 'E'

FIG. 4 shows a flow-chart of a method 400 of determining optical probe location relative to PIC in accordance with a representative embodiment. Notably, many aspects and details of the representative described in connection with FIG. 4 may be common to those described above in connection with FIGS. 1A-3B, with particular reference to the details of the representative embodiments described in connection with FIGS. 3A-3B. These common aspects and details may not be repeated to avoid obscuring the description sequence for determining the location of the absolute maximum reflection presently described. Furthermore, as alluded to above, the method of FIG. 4 is contemplated for use in connection with the system 100 of FIG. 1, and may be implemented as instructions stored in memory 116 executed by the processor 118 of the controller 114.

At 401, method 400 begins by moving the optical waveguide probe 101 in x, y (i.e., a plane such as plane B in FIGS. 3A-3B to search for a maximum reflection from the DOE 106 of the PIC 103 at a starting height (z dimension); and recording the location of the maximum reflection position at the starting height, $p_o=(x_o, y_o, z_o)$, in memory 116.

At 402, optical waveguide probe 101 is moved up by height offset, Δh (in the z-direction).

At 403, the optical waveguide probe 101 is moved in the x,y plane (e.g., plane C is FIGS. 3A-3B) at the new height (z coordinate) to search for the location of a maximum reflection from the DOE 106 of the PIC 103 at the new height; and the location of the maximum reflection in this second planed is recorded in memory 116 at position, $p_1=(x_1, y_1, z_o+\Delta h)$ At 404, the beam angles are estimated from a difference of positions, $b_{est}=p_1-p_0$. By way of illustration, the beam angle of line 301 in FIG. 3A is determined by the processor 118 and stored in the memory 116.

At 405, optical waveguide probe 101 is translated or moved in three dimensions (x, y, z), along direction of $b_{est}$, to search for a location of maximum reflection at the new coordinates. Notably, and as described above in connection with FIG. 3A, at each offset iteration, the optical waveguide probe 101 may be moved in the x, y plane at its new position to search for a maximum reflection from the DOE 106 at this new height.

At 406 the position of the absolute maximum reflection is recorded in memory 116, and provides a reference height $p_{ref}=(x_{ref}, y_{ref}, z_{ref})$, which is the solid dot in plane "F" in FIG. 3A.

At 407 the optical waveguide probe 101 is displaced from $p_{ref}$ along direction of $b_{est}$ by Δa, which is the height offset to plane "D." This movement may be along line 301 of FIG. 3A, for example, along line 301 from plane "F" to plane "D."

At 408 the optical waveguide probe 101 is moved in the x,y plane to search for maximum reflection from the DOE 106 at this height; this position $p_{hi}=(x_{hi},y_{hi},z_{hi})$ is recorded in memory 116.

At 409 the optical waveguide probe 101 is moved down from $p_{ref}$ along direction of $b_{est}$ by Δb. This movement may be along line 301 of FIG. 3A, for example, along line 301 from plane "F" to plane "E."

At 410, the optical waveguide probe 101 is moved in the x,y plane to search for maximum reflection from the DOE 106 at this height; this position, $p_{lo}=(x_{lo},y_{lo},z_{lo})$ is recorded in memory 116.

At 411, based on the difference of the positions $b_{act}=p_{hi}-p_{lo}$ the processor 118 determines the beam angles and these angles are recorded in memory 116.

Finally, at 412, reference position $p_{ref}$ and beam angle $b_{act}$ are recorded in memory and are used to locate the optical waveguide probe 101 in three dimensions at a location of the absolute maximum reflected power and determine the pointing angles of the probe beam.

Although various components, systems and methods for determining optical probe location relative to a PIC comprising a diffractive optical element (DOE) disposed in the PIC have been described with reference to several representative embodiments, it is understood that the words that have been used are words of description and illustration, rather than words of limitation. Changes may be made within the purview of the appended claims, as presently stated and as amended, without departing from the scope and spirit of the present teachings.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "teachings" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The inventive concepts also encompass a computer readable medium that stores instructions that cause a data processing system (such as the DSP of an NVA) to execute the methods described herein. A computer readable medium is defined to be any medium that constitutes patentable subject matter under 35 U.S.C. § 101 and excludes any medium that does not constitute patentable subject matter under 35 U.S.C. § 101. Examples of such media include non-transitory media such as computer memory devices that store information in a format that is readable by a computer or data processing system. More specific examples of non-transitory media include computer disks and non-volatile memories.

Aspects of the present invention may be embodied as an apparatus, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The preceding description of the disclosed embodiments is provided to enable any person skilled in the art to practice the concepts described in the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

The invention claimed is:

1. A system for determining optical probe location relative to a photonic integrated circuit (PIC), comprising:
   a diffractive optical element (DOE) disposed in the PIC, the DOE having a focal point of absolute maximum reflection at location having coordinates in three-dimensions above the PIC;
   an optical waveguide probe;

an optical source adapted to provide light through the optical waveguide probe and incident on the DOE, wherein the DOE reflects and focuses light back to the optical waveguide probe;
a power meter adapted to receive at least a portion of the light reflected and focused at the focal point of maximum above the PIC;
a motorized positioner adapted to move in optical waveguide probe in the three-dimensions above the PIC; and
a controller comprising a processor and a memory that stores instructions, which when executed by the processor, causes the processor to: control the motorized positioner to: move the optical waveguide probe in a first plane to locate a first maximum reflection in the first plane; move the optical waveguide probe to a second plane, and move the optical waveguide probe in the second plane to locate a second maximum reflection in the second plane; move the optical waveguide probe to other planes until the absolute maximum reflection is located.

2. The system of claim 1, wherein the instructions, when executed by the processor, cause the processor to estimate a beam angle of the optical waveguide probe with respect to the DOE based on a line between the first and second maximum reflections, and movement of the optical waveguide probe is along the line to locate the absolute maximum reflection in a third plane, wherein the location of the absolute maximum reflection is a reference point in three dimensions.

3. The system of claim 2, wherein the instructions, when executed by the processor further cause the motorized positioner to: move the optical waveguide probe in the third plane to locate the location of the absolute maximum reflection.

4. The system of claim 2, wherein the instructions, when executed by the processor further cause the motorized positioner to:
adjust a height of the optical waveguide probe between the first maximum reflection and the second maximum reflection and move the optical waveguide probe in a fourth plane to locate a fourth maximum reflection in the fourth plane.

5. The system of claim 4, wherein the instructions, when executed by the processor further cause the motorized positioner to:
adjust the height the optical waveguide probe along the line between the first maximum reflection and the second maximum reflection to a fifth plane and move the optical waveguide probe in the fifth plane to locate a fifth maximum reflection.

6. The system of claim 5, wherein the instructions, when executed by the processor further cause the motorized positioner to: determine a beam angle from the locations of the fourth maximum reflection and the fifth maximum reflection.

7. The system of claim 1, wherein the DOE is not a linear diffraction grating.

8. The system of claim 1, wherein the optical waveguide probe does not contact a surface of the PIC.

9. The system of claim 2, wherein the location of the maximum reflection is insensitive to an angle of the optical waveguide probe.

10. A non-transitory computer readable medium that stores instructions for a system comprising: a photonic integrated circuit (PIC), comprising: a diffractive optical element (DOE) disposed in the PIC, the DOE having a focal point of absolute maximum reflection at location having coordinates in three-dimensions above the PIC; an optical waveguide probe; and an optical source adapted to provide light through the optical waveguide probe and incident on the DOE at a beam angle, wherein the DOE reflects and focuses light back to the optical waveguide probe, wherein the instructions, when executed by a processor, cause the processor to:
control a motorized positioner to: move an optical waveguide probe in a first plane to locate a first maximum reflection of a DOE in the first plane; move the optical waveguide probe to a second plane, and move the optical waveguide probe in the second plane to locate a second maximum reflection of the DOE in the second plane; and estimate a beam angle based on the first reflection maximum.

11. The non-transitory computer readable medium of claim 10, wherein the instructions, when executed by the processor further cause the processor to control the motorized positioner to move the optical waveguide probe along a line between the first maximum reflection and the second maximum reflection to locate the absolute maximum reflection in a third plane, wherein a location of the absolute maximum reflection is a reference point in three dimensions.

12. The non-transitory computer readable medium of claim 10, wherein the instructions, when executed by the processor further cause the motorized positioner to: move the optical waveguide probe in a third plane to locate the absolute maximum reflection.

13. The non-transitory computer readable medium of claim 10, wherein the instructions, when executed by the processor further cause the motorized positioner to:
adjust a height of the optical waveguide probe along a line between the first maximum reflection and the second maximum reflection and move the optical waveguide probe in a fourth plane to locate a fourth maximum reflection in the fourth plane.

14. The non-transitory computer readable medium of claim 13, wherein the instructions, when executed by the processor further cause the motorized positioner to:
adjust the height the optical waveguide probe along the line between the first maximum reflection and the second maximum reflection to a fifth plane and move the optical waveguide probe in the fifth plane to locate a fifth maximum reflection.

15. The non-transitory computer readable medium of claim 14, wherein the instructions, when executed by the processor further cause the motorized positioner to: determine a beam angle from locations of the fourth maximum reflection and the fifth maximum.

16. The non-transitory computer readable medium of claim 11, wherein the first, second and third maximum reflections are not from a linear diffraction grating.

17. The non-transitory computer readable medium of claim 10, wherein a location of the absolute maximum reflection is insensitive to an angle of the optical waveguide probe.

18. A method of determining location of an optical waveguide probe relative to a photonic integrated circuit (PIC) comprising a diffractive optical element (DOE) disposed in the PIC, the DOE being a focusing optical element and having a focal point of absolute maximum reflection at location having coordinates in three-dimensions above the PIC, the method comprising:
moving the optical waveguide probe in a first plane to locate a first maximum reflection in the first plane;

moving the optical waveguide probe to a second plane, and moving the optical waveguide probe in the second plane to locate a second maximum reflection in the second plane; and estimating a beam angle of the optical waveguide probe with respect to the DOE based on the first reflection maximum.

19. The method of claim 18, further comprising:

moving the optical waveguide probe along a line between the first maximum reflection and the second maximum reflection to locate the absolute maximum reflection in a third plane, wherein the location of the absolute maximum reflection is a reference point in three dimensions.

20. The method of claim 18, wherein the method further comprises:

moving the optical waveguide probe along a line between the first maximum reflection and the second maximum reflection and move the optical waveguide probe in a fourth plane to locate a fourth maximum reflection in the fourth plane.

\* \* \* \* \*